United States Patent [19]
McNesby

[11] Patent Number: 5,113,417
[45] Date of Patent: May 12, 1992

[54] FRAME DETECTION SYSTEM
[75] Inventor: John B. McNesby, Mesa, Ariz.
[73] Assignee: Siemens Communication Systems, Inc., Boca Raton, Fla.
[21] Appl. No.: 589,234
[22] Filed: Sep. 27, 1990
[51] Int. Cl.[5] ............................................. H04L 7/06
[52] U.S. Cl. ..................................... 375/116; 370/106
[58] Field of Search ............... 375/111, 113, 114, 116; 370/105.1, 105.5, 106; 340/825.65; 364/715

[56] References Cited
U.S. PATENT DOCUMENTS 3,594,502  7/1971  Clark ................................. 375/114 X
3,662,114  5/1972  Clark ..................................... 370/106

Primary Examiner—Benedict V. Safourek
Assistant Examiner—Tesfaldet Bocure
Attorney, Agent, or Firm—Joseph S. Codispoti; Eugene S. Indyk

[57] ABSTRACT

A frame detection circuit for SONET which operates in both the OC-3 and OC-12 modes. The frame detection circuit operates by examining the incoming data bit stream, detecting A1 and A2 bytes, and counting three consecutive A1 bytes immediately followed by three consecutive A2 bytes. Since the counters recycle upon reaching a three count, the circuit works for both the OC-3 and OC-12 modes.

8 Claims, 2 Drawing Sheets

FRAME DETECTION SYSTEM

BACKGROUND OF THE INVENTION

This invention relates to digital communications systems wherein data is serially transmitted in frames of multi-bit bytes and, more particularly, to a frame detection arrangement for use in such a system.

A relatively new transmission standard has been developed for Synchronous Optical Network (SONET), which is derived from a base rate and format, combined with a multiplexing scheme. This results in a modular family of rates and formats available for use in optical interfaces. The base rate is known as the Synchronous Transport Signal level 1 (STS-1). Each STS-1 frame is a serial bit stream of 810 bytes, with each byte including eight bits. The STS-1 framing is dedicated to the first two bytes of each STS-1 frame. The framing pattern for bytes A1 and A2 is F628 Hex (1111011000101000), where A1 equals F6 Hex (11110110) and A2 equals 28 Hex (00101000). Higher rates (STS-N) in SONET are accomplished by byte interleave multiplexing an N number of STS-1 frames. The framing pattern for an STS-3 frame in an Optical Carrier level 3 (OC-3) system is then A1A1A1A2A2A2. Similarly, the framing pattern for an STS-12 frame in an OC-12 system is twelve A1 bytes followed by twelve A2 bytes.

The basic function of a frame recovery circuit in a communications system is to recognize and lock onto the framing pattern, provide frame lock indication, and resynchronize the receiver to the incoming data stream in a minimum amount of time. It is a primary object of this invention to provide a frame recovery circuit which may be used in both an OC-3 and an OC-12 system.

SUMMARY OF THE INVENTION

The foregoing, and additional, objects are attained in accordance with the principles of this invention by providing a frame detection circuit which examines the incoming data bit stream, detects A1 and A2 bytes, and counts three consecutive A1 bytes immediately followed by three consecutive A2 bytes. In the event consecutive A1 or A2 bytes are not detected, the circuit resets itself.

In accordance with an aspect of this invention, A1 and A2 bytes are recognized by routing the incoming data bit stream into a shift register and using simple AND gates connected to appropriate logic level outputs of the shift register.

In accordance with another aspect of this invention, the counters recycle upon reaching a count of three.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
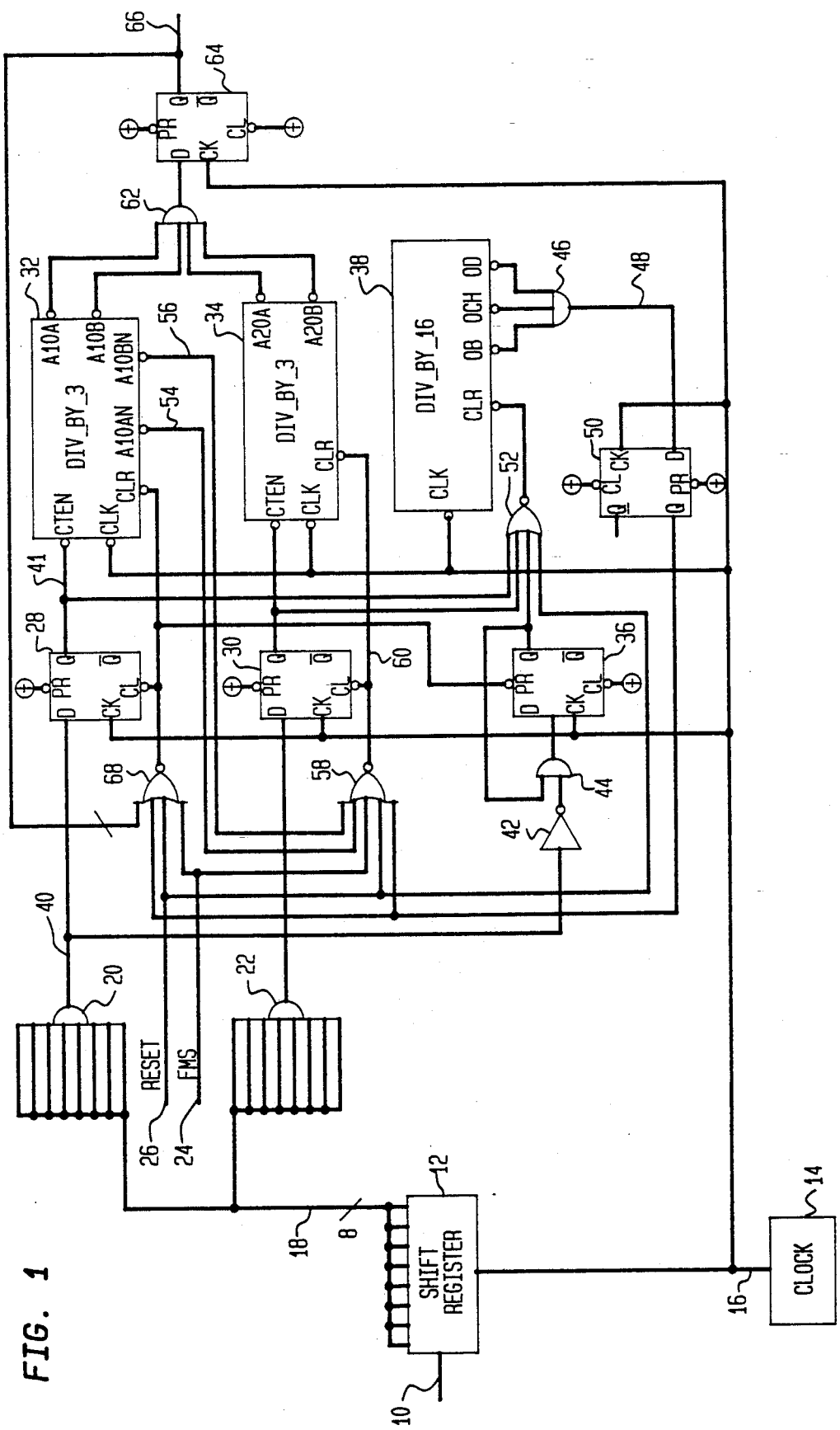
FIG. 1 is a schematic logic circuit diagram of a frame detection circuit constructed in accordance with the principle of this invention.

Referring now to the drawings, FIG. 1 illustrates a frame detection circuit which is designed in accordance with the principles of this invention to operate in both an OC-3 and an OC-12 system. The circuit of FIG. 1 operates to examine each bit in a SONET STS-3 or STS-12 serial bit stream to achieve frame lock, provide a resynchronization pulse and a frame lock indication.

The serial data bit stream is applied to the circuit of FIG. 1 over the lead 10 as an input to the eight bit serial to parallel shift register 12. The serial data bit stream on the lead 10 contains data, framing, and other overhead bytes, with each of the bytes being made up of eight bits. The serial data bit stream is shifted through the shift register 12 by means of the clock 14, one bit at a time. Although an individual clock 14 is illustrated in FIG. 1, the clock pulses on the lead 16 will actually be derived from the main system clock. The eight outputs of the shift register 12 on the leads 18 are applied to eight input AND gates 20 and 22 with proper logic levels to effect a clockwide pulse on the output of the AND gate 20 whenever an A1 byte is completely contained within the shift register 12. Likewise, a clockwide pulse appears at the output of the AND gate 22 whenever an A2 byte is completely contained within the shift register 12.

When the system is initialized (powered up), the frame search (FMS) signal on the lead 24 is held low and the reset signal on the lead 26 is caused to go high and decays to a low value, initializing the circuit. During normal operations with frame lock having been achieved, the signal on the lead 26 is low and the signal on the lead 24 is held high to disable the circuit of FIG. 1, so as not to allow false frame detection and resynchronization on data which may coincidentally contain the framing pattern of three (or twelve) A1 bytes followed by three (or twelve) A2 bytes. The signal on the lead 24 is brought low when a loss of frame is detected and a frame search is required. When the signals on both the leads 24 and 26 are low, whether at initialization or loss of frame, the operation of the circuit of FIG. 1 is initiated with the flip-flops 28 and 30 and both divide by three counters 32 and 34 cleared, and the flip-flop 36 set, which latter keeps the divide by sixteen counter 38 reset.

The flip-flops 28, 30 and 36 filter any glitches on the outputs of the AND gates 20 and 22. Upon detection of an A1 byte, the clockwide pulse on the output lead 40 of the AND gate 20 is clocked by the flip-flop 28, causing the Q output of the flip-flop 28 on the lead 41 to go high. This causes the divide by three counter 32 to increment its count. The counter 32 is only enabled to increment its count when an A1 byte is detected by the AND gate 20.

The output of the AND gate 20 on the lead 40 is inverted by the invertor 42 and applied to the AND gate 44. The output of the AND gate 44 is clocked by the flip-flop 36. The low signal clocked by the flip-flop 36 when the first A1 byte is detected enables the divide by sixteen counter 38 to start counting on the next and subsequent clock pulses on the lead 16. The counter 38 is part of a reset circuit. If, within the next eight serial data bits shifted into the shift register 12 an A1 byte is not detected by the AND gate 20 (non-consecutive A1 bytes), the counter 38 increments until a ten count is decoded by the AND gate 46. The positive output of the AND gate 46 on the lead 48 is clocked by the flip-flop 50 to clear all the counters 32, 34 and 38 to a zero count. The divide by sixteen counter 38 is held cleared by the setting of the flip-flop 36. This clearing of the counters occurs whenever an A1 or A2 byte is not followed by a consecutive A1 or A2 byte.

However, if within the next eight serial data bits shifted into the shift register 12 an A1 byte is detected (consecutive A1 bytes), the resulting high on the lead 40 will clear the divide by sixteen counter 38 to a zero count through the NOR gate 52, before the counter increments to a ten count.

Figure 2:
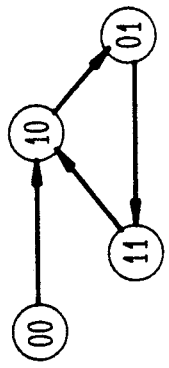
FIG. 2 is a state diagram for the recycling counters used in the circuit of FIG. 1.
Figure 3:
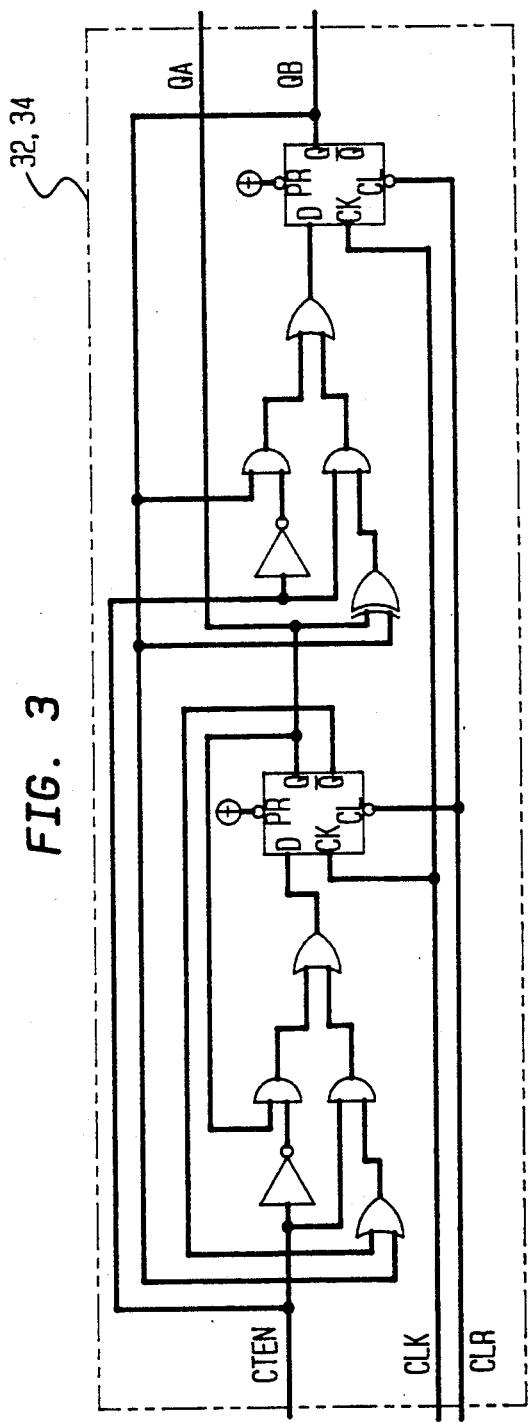
FIG. 3 is a schematic logic diagram of an illustrative counter which operates in accordance with the state diagram of FIG. 2.

The detection of three consecutive A1 bytes enables the divide by three counter 32 to increment to a three count. In an OC-3 system, the framing pattern is three A1 bytes followed by three A2 bytes. However, in an OC-12 system, the framing pattern is twelve A1 bytes followed by twelve A2 bytes. Since the circuitry of FIG. 1 is designed to work in both the OC-3 and OC-12 modes of operation, the divide by three counter 32 is designed so that in an OC-12 system, three consecutive A1 bytes are counted four times and the counter 32 ends up with a three count at the end of twelve A1 bytes. This was accomplished by designing the divide by three counter 32, as well as the divide by three counter 34, to operate in accordance with the state diagram shown in FIG. 2. Count begins at a reset count of binary "00" and increments through the binary sequence 10, 01, 11, so that at every third A1 byte the count is a binary 11. FIG. 3 shows an illustrative counter which operates in accordance with the state diagram of FIG. 2 and which may be utilized for the divide by three counters 32 and 34.

To repeat, the count of the counter 32 only changes when an A1 byte is detected or when the counter is reset by a time out controlled by the divide by sixteen counter 38. When the counter 32 is at a count of three so that its output leads 54 and 56 are both low, this enables the divide by three counter 34 through the NOR gate 58 (by removing the clear signal on the lead 60) to increment when an A2 byte is detected by the AND gate 22. The operation of detecting A2 bytes, enabling the divide by three counter 34, and clearing of the counter 34 in response to a ten count in the counter 38 when nonconsecutive A2 bytes are detected, is the same as described above with respect to the counting of the A1 bytes.

When both of the counters 32 and 34 are at three counts, which indicates that three consecutive A1 bytes have been followed by three consecutive A2 bytes, the output of the AND gate 62 goes high and is clocked by the flip-flop 64. The output of the flip-flop 64 on the lead 66 provides a frame lock indication and system synchronization signal to the remainder of the communications system. This signal is also fed back to the NOR gate 68 to clear the flip-flops 28 and 30 and both the divide by three counters 32 and 34, and set the flip-flop 36 which clears and holds clear the divide by sixteen counter 38.

Thus, the frame detection circuit shown in FIG. 1 provides a frame detect signal whenever an integral multiple of three A1 bytes is followed by three A2 bytes. The system of which the circuit of FIG. 1 forms a part knows whether it is in the OC-3 or OC-12 mode. If the system is in the OC-3 mode, the frame detect signal is generated six bytes after the start of the frame (three A1 bytes followed by three A2 bytes) so that the system can count back six bytes to get the start of frame. If the system is in the OC-12 mode, the frame detect signal is generated fifteen bytes after the start of the frame (twelve A1 bytes followed by three A2 bytes) so the system can count back fifteen bytes to get the start of frame.

Accordingly, there has been described an arrangement for detecting frames in a digital communications system wherein data is serially transmitted in frames of multi-bit bytes. While a single embodiment has been disclosed, it will be apparent to those of ordinary skill in the art that various modifications and adaptations to the disclosed arrangement are possible, and it is only intended that this invention be limited by the scope of the appended claims.

I claim:

1. In a digital communications system wherein data is serially transmitted in frames of multi-bit bytes at a fixed clock rate and framing is defined by a framing pattern at the start of each frame, the framing pattern comprising a predetermined number of bytes of a first digital pattern followed by said predetermined number of bytes of a second digital pattern, an arrangement for detecting said framing pattern in transmitted data and providing a frame signal when said framing pattern is detected comprising:

clock means for providing clock pulses at said fixed clock rate;

means for receiving said data;

first detection means for examining the received data bits and providing a first signal when N sequentially received data bits form said first digital pattern, where N is an integral number equal to the number of bits in a byte;

second detection means for examining the received data bits and providing a second signal when N sequentially received data bits form said second digital pattern;

first counter means responsive to the occurrence of said first signal for incrementing an internal count;

means responsive to the internal count of said first counter means reaching said predetermined number for providing an enabling signal;

second counter means enabled by said enabling signal for incrementing an internal count in response to the occurrence of said second signal;

reset means utilizing said clock pulses and responsive to a first occurrence of said first signal or said second signal for resetting the internal counts of said first and second counter means in the event there is not another occurrence of said first signal or said second signal after N clock pulses; and output means responsive to the internal count of said second counter means reaching said predetermined number after the internal count of said first counter means reached said predetermined number for generating said frame signal.

2. The arrangement of claim 1 wherein said first detection means comprises:

an N-stage shift register;

means utilizing said clock pulses for serially shifting the received data bits through said shift register; and first decoding means coupled to the stages of said shift register and responsive to the contents of said shift register forming said first digital pattern for generating said first signal.

3. The arrangement of claim 2 wherein said first decoding means comprises an N-bit AND gate.

4. The arrangement of claim 2 wherein said second detection means comprises:
   second decoding means coupled to the stages of said shift register and responsive to the contents of said shift register forming said second digital pattern for generating said second signal.

5. The arrangement of claim 4 wherein said second decoding means comprises an N-bit AND gate.

6. The arrangement of claim wherein said predetermined number is an integral multiple of a base number greater than one and each of said first and second counter means is arranged so that its internal count recycles upon reaching said base number, said output means being coupled to said first and second counter means and responsive to the internal counts of both said first and second counter means being at said base number for generating said frame signal.

7. The arrangement of claim 6 wherein said output means includes: p1 an output AND gate coupled to said first counter means and said second counter means; and a D-type flip-flop having its D-input coupled to the output of said output AND gate and its clock input coupled to receive said clock pulses, wherein said frame signal appears at the Q output of said flip-flop.

8. The arrangement of claim 7 further including means coupled to the Q output of said flip-flop for resetting said first counter means upon the occurrence of said frame signal.

* * * * *

UNITED STATES PATENT AND TRADEMARK OFFICE
CERTIFICATE OF CORRECTION

PATENT NO. : 5,113,417
DATED : May 12, 1992
INVENTOR(S) : McNesby

It is certified that error appears in the above-identified patent and that said Letters Patent is hereby corrected as shown below:

Column 6
  Line 4, delete: "means includes: p1 an output AND gate coupled to said"

and insert in its place:

--means includes:
          an output AND gate coupled to said--

Signed and Sealed this

Twentieth Day of July, 1993

Attest:

MICHAEL K. KIRK

Attesting Officer        Acting Commissioner of Patents and Trademarks